No. 791,306.   Patented May 30, 1905.

UNITED STATES PATENT OFFICE.

FELIX WILHELM WESTHAUSSER, OF HOHENHEIM, NEAR STUTTGART, GERMANY.

PROCESS OF MAKING HYDROHALOGENIC ACID.

SPECIFICATION forming part of Letters Patent No. 791,306, dated May 30, 1905.

Application filed September 24, 1904. Serial No. 225,866.

*To all whom it may concern:*

Be it known that I, FELIX WILHELM WESTHAUSSER, a subject of the King of Saxony, and a resident of Hohenheim, near Stuttgart, Germany, have invented a Process for the Manufacture of Hydrohalogenic Acid, of which the following is a specification.

The present invention relates to a process for the production of hydrohalogenic acid, and more especially of hydrochloric acid and of hydrobromic acid.

It is well known that hydrochloric acid can be continuously produced from chlorin and hydrogen if these two gases in molecular quantities are brought into action directly on a contact substance, such as carbon or platinum. Such a process, as has been proved to be the case, possesses certain drawbacks. Thus neither sufficient yields can be obtained nor can explosions be avoided with certainty even when a certain excess of hydrogen is employed.

The new process is based, on the one hand, on the observation that a mechanical (*i. e.*, chemically uncombined) mixture of chlorin and hydrogen is taken up by basic chlorids or oxy-chlorids and hydroxids under conditions stated below, a chlorid and water being formed, and, on the other hand, on the fact in itself well known that various chlorids of metals—as, for example in particular, aluminium chlorid, zinc chlorid, and chlorid of tin—if they are heated in the presence of water are decomposed partially into basic chlorids or hydroxids (on the heating being continued, into oxids) and hydrochloric acid. The additional observation is of importance, that the basic chlorids or hydroxids hereby formed can be always practically utilized again for the operation of the taking up of chlorin and hydrogen, with the formation of a chlorid and water. The reactions in the case of the use of zinc compounds, for example, proceed according to the following equations:

1. 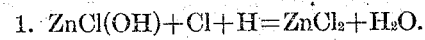 $ZnCl(OH) + Cl + H = ZnCl_2 + H_2O$.

2. 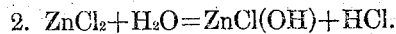 $ZnCl_2 + H_2O = ZnCl(OH) + HCl$.

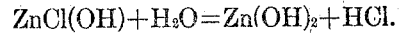 $ZnCl(OH) + H_2O = Zn(OH)_2 + HCl$.

The above-mentioned property is also shown by the aqueous solutions of the metal chlorids in question, such solutions showing an acid reaction which can be recognized by means of litmus, a phenomenon which indicates that a decomposition into basic chlorid or hydroxid and hydrochloric acid has already occurred.

The instanced reactions can be usefully employed in various ways according to the present invention for the conversion of chlorin and hydrogen into hydrochloric acid. Thus the mixture of chlorin and hydrogen produced, preferably, by the electrolysis of solutions of common salt, potassium-chlorid, and similar chlorids after being saturated with water-vapor at a suitable temperature can be either, first, conducted over porous bodies which are charged with the metal chlorids to be decomposed or which are impregnated with their concentrated aqueous solutions, or, second, allowed to act on the chlorid solutions, the gases flowing in the opposite direction to the liquids as they trickle downward, or, third, allowed to flow through the aqueous solutions of the metal chlorids, which can be effected under pressure or by means of a partial vacuum—for example, by sucking off the gases from the electrode-spaces. The action is based in all cases upon an alternating decomposition of the chlorid which is present or formed by means of heat and a transitory fresh formation of chlorid by means of the operating gas mixture.

For carrying out the process in agreement with the above statements those chlorids are suitable the solutions of which have an acid reaction with litmus, so that besides the chlorids already mentioned—viz., the chlorids of aluminium, zinc, and tin—those of magnesium, antimony, cadmium, bismuth, and boron, and also those of iron, chromium, and manganese, or mixtures of those chlorids are also suitable. The temperature to be observed is different for the different chlorids, and the degree of decomposition also depends on the temperature employed. In general temperatures of about 100° centigrade give good results; but in the case of some chlorids a higher temperature should be employed, and in the case of chlorid of tin, for example, the temperature should be even lower. Further, in the case of solutions being employed through the sufficient supply of water-vapor care must be taken that the concentration of the solutions which is not too weak remains approximately the same.

In an analogous manner bromin can be converted into hydrochromic acid.

That, as a matter of fact, the stated transformation takes places in sufficient manner is proved by the following experiment: Into a still-head of a capacity of about three hundred cubic centimeters, which is provided with a condenser as well as a receiver and a dropping-funnel or the like for the supply of water and with a thermometer and gas supply and delivery tube, are placed one hundred and fifty cubic centimeters of an aluminium-chlorid solution of 1.33 to 1.35 specific gravity, which contains about twenty-six per cent. chlorin. Such a solution begins at 110° centigrade to give off water and at about 120° centigrade acid and forthwith if the heating is cautiously continued precipitations are formed therein. In a second still-head having a capacity of about two hundred and fifty cubic centimeters, which is provided with a gas-delivery tube and with a tube drawn out below as a capillary tube for enabling air to be sucked through and with two electrodes (for example, carbon electrodes) and which is connected with the first still-head by means of a bottle containing water, which bottle is suitably warmed, two hundred cubic centimeters hydrochloric acid (1.1) are placed for this experiment. Forthwith electrolysis is proceeded with, a current of 1.5 amperes and a voltage of about four volts being employed. The aluminium-chlorid solution in the first still-head is heated, for example, in a sandbath to 120° to 130° centigrade, and the gas mixture evolved is sucked in a slow stream through the apparatus, warm water first of all and then hot water being allowed to flow into the aluminium-chlorid solution according as it distills off. If after two hours the reaction is interrupted and air is sucked through the first still-head for the sake of removing the free chlorin which has resulted from the decomposition, the liquid being cooled there remains in the distillate collected in the receiver (from which distillate dissolved chlorin is previously likewise removed by sucking through air or by heating) 2.5 grams chlorin, equal to 2.6 grams hydrochloric acid. If one reckons that in one hour 1.3 × 1.5 = 2.0 grams chlorin and the equivalent quantity of hydrogen are evolved, it follows that 1.3 grams, equal to sixty-five per cent., are converted into hydrochloric acid. The chlorin left over can be employed in any desired manner. For example, it can be worked up into chlorid of lime. Also chlorin left over can be reduced to a minimum by a suitable diminution of the intensity of the current. The aluminium-chlorid solution containing initially twenty-six per cent. chlorin indicates in this experiment after the end of the reaction only 25.4 per cent. chlorin, which can be explained by the fact that the difference of 0.6 per cent. has been split off or removed as hydrochloric acid during the passage of the air. The determination of the hydrochloric acid was undertaken after being suitably diluted, according to Volhard's method, by means of a one-fifth normal silver-nitrate solution and ammonium sulfocyanid.

In the case of the stated experiment, for the sake of more easily demonstrating the action of the process, the working mixture of the chlorin and hydrogen is produced by means of electrolysis from hydrochloric acid. For the practical process of the manufacture of hydrochloric acid according to the present invention mixtures of chlorin and hydrogen are employed as offered in practice. Thus, as already indicated above, hydrogen-chlorin mixtures are employed which are obtained in the practical electrolysis of chlorid solutions. These mixtures are then, like the hydrogen-chlorin mixture obtained for the above experiment by the electrolysis of hydrochloric acid, subjected to the described action of one of the characterized chlorid solutions. The technical carrying out of the process in practice is, moreover, effected in the same manner as stated in the case of the above-described experiment. It is only necessary to increase the quantities and the apparatus to a suitable extent—for example, to increase them tenfold or up to one hundred fold.

In an analogous manner hydrobromic acid can also be manufactured according to the present invention.

What I claim is—

1. Process for the production of a hydrohalogenic acid, consisting in bringing a mechanical mixture of its components in a humid condition and under the influence of heat into reciprocal action with decomposable corresponding halogenides of metals, substantially as described.

2. Process for the production of a hydrohalogenic acid, consisting in conducting a mechanical mixture of its components in a humid condition and under the influence of heat over porous bodies charged with decomposable corresponding halogenides of metals, substantially as described.

3. Process for the production of hydrochloric acid, consisting in bringing a mechanical mixture of its components in a humid condition and under the influence of heat into reciprocal action with decomposable chlorids of metals, substantially as described.

4. Process for the production of hydrochloric acid, consisting in bringing a mechanical mixture of its components in a humid condition and under the influence of heat into reciprocal action with aluminium chlorid, substantially as described.

In testimony whereof I have signed my name to this specification in the presence of two subscribing witnesses.

FELIX WILHELM WESTHAUSSER.

Witnesses:
JOHN OSWALD,
ERNST ENTERMANN.